United States Patent [19]

Heater et al.

[11] 4,091,772

[45] May 30, 1978

[54] INTERNAL COMBUSTION ENGINE WITH DELAYED TORCH IGNITION OF OIL FUEL CHARGE

[75] Inventors: William R. Heater; Fred S. Schaub; John R. Kennedy, all of Mount Vernon, Ohio

[73] Assignee: Cooper Industries, Inc., Houston, Tex.

[21] Appl. No.: 686,279

[22] Filed: May 14, 1976

[51] Int. Cl.² ............................ F02B 3/02; F02B 19/10
[52] U.S. Cl. .......................... 123/32 SP; 123/27 GE; 123/30 B; 123/191 S
[58] Field of Search ............ 123/27 GE, 32 SP, 32 C, 123/32 ST, 32 F, 32 G, 30 B, 33 D, 191 S, 191 SP

[56] References Cited

U.S. PATENT DOCUMENTS

| | | | |
|---|---|---|---|
| 1,096,405 | 5/1914 | Thomson | 123/32 D |
| 1,554,877 | 9/1925 | Niefer | 123/32 D X |
| 1,653,825 | 12/1927 | Saives | 123/33 D |
| 1,826,788 | 10/1931 | Huber | 123/32 SP |
| 2,153,618 | 4/1939 | Fischer | 123/191 M |
| 2,799,255 | 7/1957 | Gehres | 123/1 |
| 3,207,141 | 9/1965 | Freeman et al. | 123/32 SP |

*Primary Examiner*—Martin P. Schwadron
*Assistant Examiner*—Richard Gerard
*Attorney, Agent, or Firm*—Vincent L. Barker, Jr.; David D. Murray

[57] ABSTRACT

A primarily oil-fueled engine is disclosed in which the engine compression ratio is established well below the level at which compression ignition of oil fuel will occur and in which the oil fuel charge is ignited by the discharge from a spark ignited, gas-fueled precombustion chamber. The compression ratio and peak firing pressures are similar to those encountered in a gas-fueled engine.

6 Claims, 3 Drawing Figures

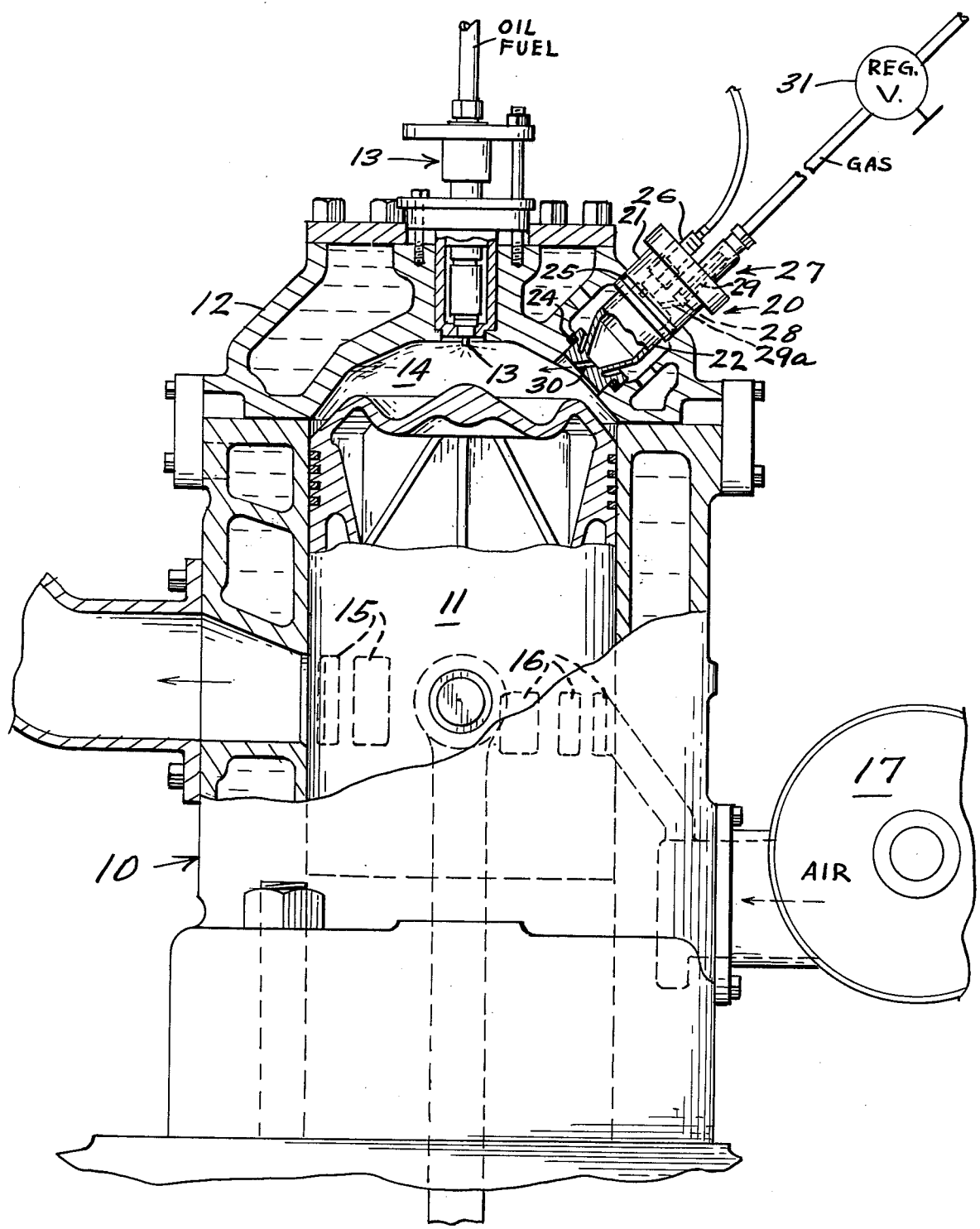
FIG-1-

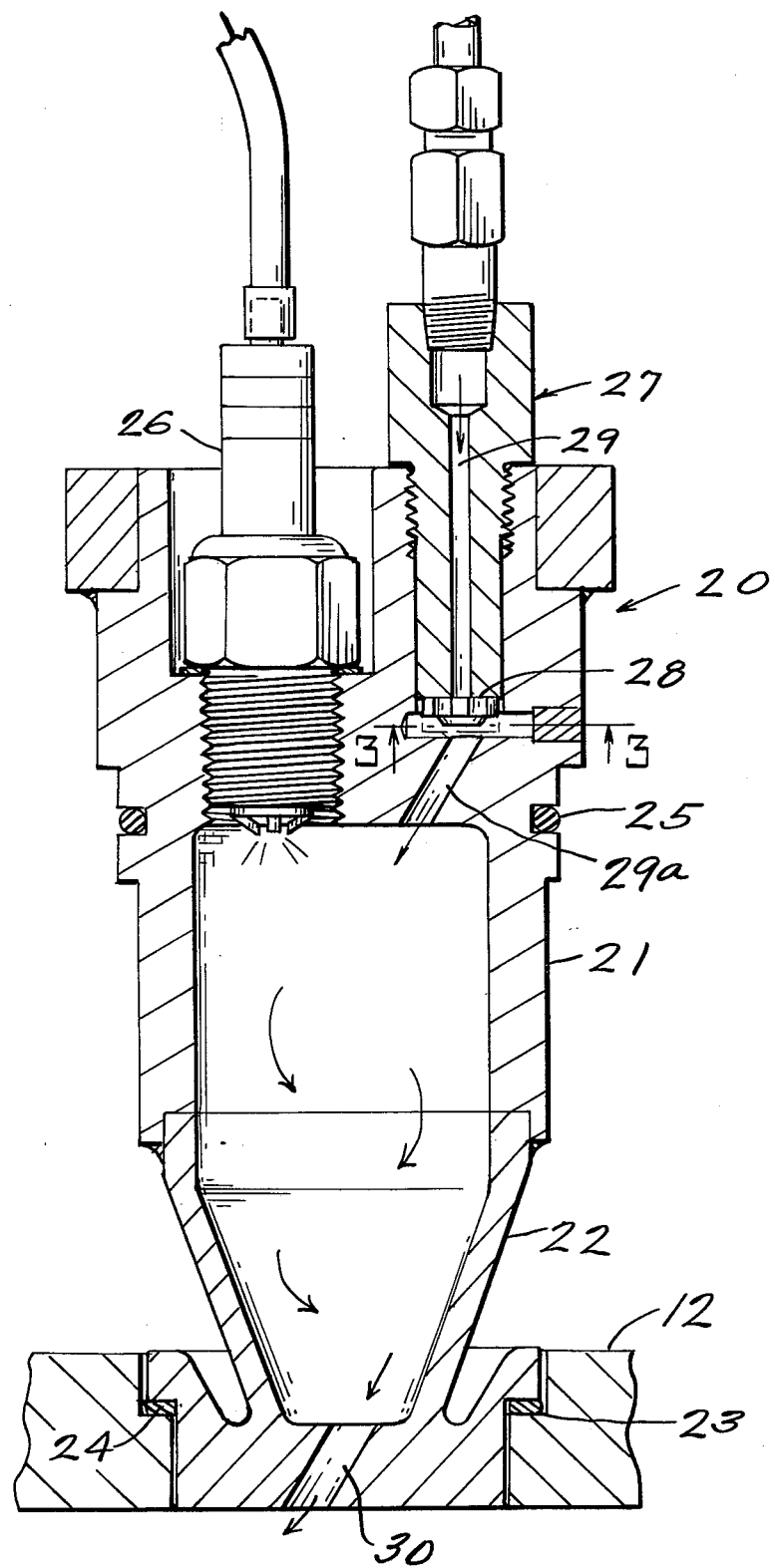
FIG-2-

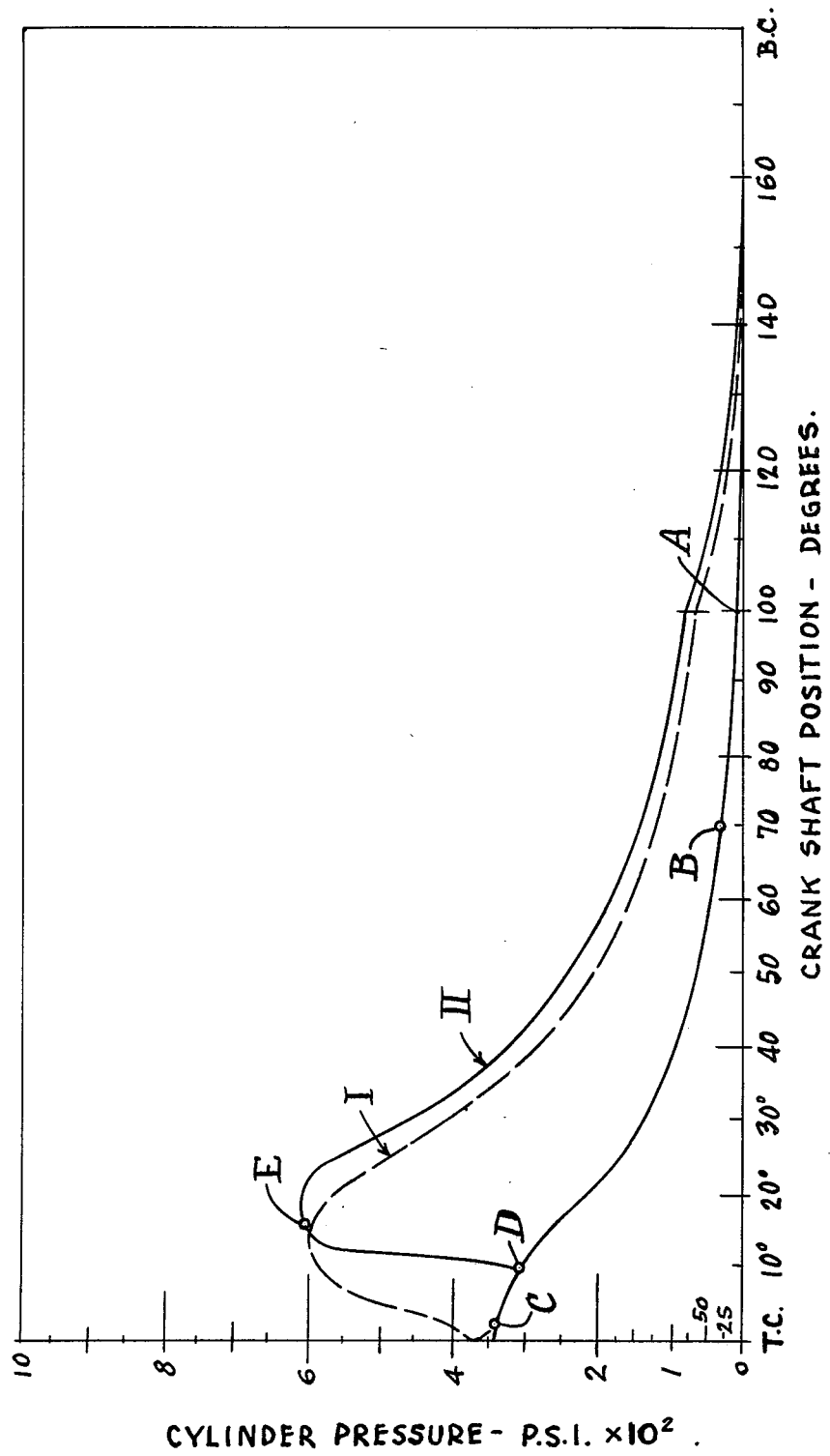

INTERNAL COMBUSTION ENGINE WITH DELAYED TORCH IGNITION OF OIL FUEL CHARGE

BACKGROUND OF THE INVENTION

The invention is characterized by the use of a small gas-fueled precombustion chamber to create an igniting flame for an injected charge of oil fuel. The system may be used in engines specifically designed for the relatively low firing pressures resulting from the new combustion arrangement, or the invention may be applied to existing gas engines where it becomes desirable to convert the engine for operation on primarily oil fuel.

The internal combustion engine art has long known that it was possible to convert a Diesel engine operating on fuel oil to a gas engine operating on natural gas by a fairly simple replacement of certain operating parts.

In the engines converted from a full Diesel cycle to a primarily gas-fueled cycle there was never any question about the strength of the engine components to withstand the conversion. A Diesel engine is characterized by a high compression ratio in the order of 12:1 to 18:1 and therefore by heavy frame and operating components to withstand the high peak pressures inherent in the Diesel cycle. On the other hand gas-fueled engines are characterized by a low compression ratio in the order of 8:1 or 9:1 and therefore by a relatively lighter frame and component construction because the peak pressures encountered in the gas engines are much lower than those encountered in Diesel engines.

Dual fuel engines have also been known for several decades in which a primarily gas-fueled engine had its charge ignited by injection of a small quantity of pilot oil. The compression ratio of such dual fuel engines was in the Diesel engine range to assure compression ignition of the pilot oil charge. Examples of a dual fuel engine may be found in Boyer U.S. Pat. No. 2,506,566 and examples of a converted Diesel-to-gas engine may be found in Friddell U.S. Pat. No. 3,187,728. It has also been proposed to operate a gas-fueled engine with an ignition source including an auxiliary combustion chamber in which a quantity of gas fuel was segregated and ignited. Such an engine is shown in Gehres U.S. Pat. No. 2,799,255. In this patent the main fuel charge is stated to be gases including methane through pentane of the hydrocarbon series. These fuels are by nature at the opposite ends of the combustion quality spectrum from oil fuel, with gas fuel having some measurable octane rating quality and a near zero cetane rating, and the liquid fuel having a reasonable cetane rating and a very poor octane rating.

These fuel differences present entirely different problems with regard to injection and combustion. The liquid fuel must be mechanically atomized and properly vaporized to permit the hydrocarbon elements to find the necessary oxygen. Due to the poor octane rating quality of the liquid fuel, it cannot be admitted to the combustion chamber too far in advance of the discharge from the precombustion chamber because of uncontrolled autoignition of a portion of the then fuel/air mixture. In the case of a conventional Diesel cycle with a good cetane fuel, the compression ratio is adequate to initiate combustion early in the fuel injection cycle. In the case of the present invention only sufficient heat is available to physically condition the fuel. Proper initiation of combustion by the precombustion chamber precludes undesirable autoignition by burning the injected fuel at the proper time, after it has experienced some chamber conditioning, but before it has accumulated in sufficient quantity to cause undesirable autoignition.

Recently the declining availability of natural gas has stimulated interest in the procurement of engines that could use liquid fuels to supplement or replace gaseous fuels. Nearly all of the natural gas pipeline compressor engines in use today operate on gaseous fuels and the desire to acquire new engines or to convert these existing engines to burn fuel oil without exceeding the stress levels imposed on engine components presents a difficult problem. As previously noted the structural strength of the typical gas engine is much lower than that of a comparable Diesel engine due to the much lower peak pressures involved in gas engine combustion. It is therefore apparent that a normal Diesel cycle (compression ignition) cannot be used in these existing engines so that while a Diesel engine can be converted to operate on gas, a gas engine cannot be converted to operate on oil fuel by known practices.

STATEMENT OF THE INVENTION

The invention comprises a combustion system for an engine that burns approximately 95% oil fuel (at full load) and about 5% gaseous fuel, and in which the small quantity of gas is injected into a precombustion chamber, ignited by a spark. The products of the gas combustion flow from the precombustion chamber directly against an injected stream of oil to ignite the latter. In a preferred form of the invention spark ignition of the gas charge occurs at about 10° ATC. Injection of the oil charge begins at about 2° ATC but this charge will not ignite (due to the low compression ratio of the engine) until it is ignited by the combustion products stream from the precombustion chamber. The oil charge is well dispersed prior to ignition.

When the invention is applied to the conversion of an existing gas engine to an engine operating primarily on liquid fuel, the compression ratio of the engine may remain unchanged from gas fuel practice or, in one preferred embodiment at 8.8:1. Conversion of a gas engine to operate according to normal Diesel engine practice would require an increase in the compression ratio of the gas engine to approximately twice this. It has been found that the peak firing pressure of an engine converted to operate on the combustion cycle of the present invention can be held between 650 and 680 pounds without difficulty. This is only insignificantly higher than that pressure encountered when the engine was operating entirely on gas fuel with spark ignition and does not overstress the engine frame and other components. The new system is suited not only for stationary service but also for use on ships carrying liquefied natural gas since the engines may be fired from the boil-off fuel as gas engines on a loaded voyage and may be fitted to burn oil fuel during the return voyage when there is no boil-off from the LNG tanks.

The employment of the gas igniter according to the invention enables the fuel oil to be injected much later in the compression cycle than would be possible for compression ignition. The late injection and even later ignition of the fuel oil keeps the firing pressure at a consistently low level, in the order of that expected in the unconverted spark ignited gas engine. Consistent starting has been achieved by the use and timing of the novel igniters and the exhaust smoke has been reduced to a tolerable level when the oil fuel is injected late in the cycle. The $NO_x$ constituents when operating on the new cycle were approximately half that encountered in a comparable engine operated as a straight spark ignited gas engine.

Gas pressure needed to charge the igniter with a gas-air mixture that will consistently fire in the igniters was only 3 psig. at cranking speed and 25 psig. at full-speed, full-load.

BRIEF DESCRIPTION OF THE DRAWINGS

FIG. 1 is a central, vertical, sectional view of an engine cylinder and cylinder head of a converted engine.

FIG. 2 is a central, vertical, sectional view of an igniter for use with the present invention.

FIG. 3 shows indicator diagrams for an unconverted and converted engine.

DETAILED DESCRIPTION OF A PREFERRED EMBODIMENT

The drawings show the present invention as applied to a two-stroke cycle engine including a cylinder 10 in which a piston 11 operates in the usual manner. While the following description is directed to an engine converted from operation on gas fuel to an engine operating on primarly oil fuel, it will be appreciated that an engine may be designed originally to operate on oil fuel with a gas-fired precombustion chamber as hereinafter described.

An injector 13 is placed, in the embodiment shown, in the center of a domed main combustion chamber 14 formed by the cylinder head 12 and piston 11. The compression ratio is between 8:1 and 9:1 in most spark ignited gas engines (8.8:1 in a specific engine) which is well below the point at which compression ignition of oil fuel injected by nozzle 13 will occur.

Piston controlled exhaust ports 15 and inlet ports 16 are formed in the wall of the cylinder 10 in the usual manner. Air is supplied to the inlet ports 16 at greater than atmospheric pressure by a supercharger 17 which may be driven by exhaust gases or separately driven as well known in the art. The engine may also be operated on a four-stroke cycle with either atmospheric or turbocharged air feed.

Since an injected oil charge will not fire in the engine due to the low compression ratio another ignition source must be found. Spark ignition of the main oil charge would be suggested by Hesselman U.S. Pat. No. 1,835,490, but is totally inadequate for large stationary engines with ratings in excess of 80 Bmep. The present invention provides an ignition source which has been found to produce reliable and consistent ignition at all loads and which can be timed to carry out a cycle which is characterized by low thermal loading, low peak pressures, a broad power curve and very satisfactory exhaust from the standpoint of pollution.

The igniter used in the present invention is shown in cross section and designated generally 20 in FIG. 2. As there indicated, the igniter includes a cylindrical body 21 having a frusto-conical discharge end 22 terminating in a flanged seat and seal portion 23 for seating in an appropriate opening in the cylinder head 12. A gasket 24 seals around the flanged end of the igniter so that it can be water-cooled to keep the operating temperature at an appropriate level. An O-ring seal 25 is provided near the top of the igniter body. The volume of the chamber formed by the igniter 20 is about 4% to 7% of the compression volume of the cylinder 10 and in a specific case a volume ratio of 5% has been found satisfactory.

At its upper end the igniter is bored to receive a conventional spark plug 26 which is energized from a conventional ignition system and timed as hereinafter described. A gas inlet valve assembly 27 is also screwed into the upper end of the igniter and in its preferred form is simply an inlet passage controlled by an inwardly opening plate-type check valve 28, which controls the flow of gas from a central passage 29a discharging to the interior of the igniter and then through a passage 30 disposed to cause the gas to flow towards the center of the cylindrical portion of the igniter and beneath the spark plug 26. A moderate swirl and good mixing of the incoming gas and air takes place within the small igniter chamber. As indicated in FIG. 1 the gas is under the control of an adjustable regulator valve 31. Gas will pass the check valve 28 whenever the regulated pressure of regulator 31 exceeds the existing compression pressure in the interior of the igniter.

In operation, gas for the igniter is taken from a low pressure gas line to the igniter under the control of the adjustable regulator 31. The gas pressure is increased as engine load and speed increases. At cranking speeds the regulator can be set to deliver gas at 3 psig., and at full load; full speed (300 rpm) the gas regulator is set at 25 psig. Obviously in practice the control of the regulator will be made automatically from a remote point.

Referring to the indicator diagrams shown in FIG. 3 and commencing at bottom dead center the cycle may be described as follows: The burned gases from the previous down stroke of the piston are scavenged by air from the supercharger 17, and the entire cylinder 10 is filled with air at the blower pressure which may be from 8.5" to 13.3" Hg (4.16 psig. to 6.5 psig.). On the upstroke of the piston, a fresh charge of air enters the igniter 20 and gas will flow into the igniter 20 only until the compression pressure reaches the gas pressure as determined by regulator 31. As soon as the regulator pressure is exceeded the plate check valve 28 will close. Thereafter the air-gas charge is compressed in the igniter and the air charge is compressed in the main combustion chamber 14 as indicated. As above noted the igniter volume is about 5% of the main cylinder volume and, on a Btu basis the gas in the igniter constitutes about 7% of the entire fuel charge at full load. For best operation, and least emissions of pollutants, oil fuel injection begins at 2° ATC, and continues at full injection pressure for the period required to put in all of the fuel. At full load this amounts to about 15°. The oil spray is given a short opportunity to disperse in the main combustion chamber. At about 10° ATC the spark plug 26 is fired and the gas charge in the igniter commences to burn rapidly. The flame from the igniter passes through a passage 30 into the main combustion chamber and ignition of the oil charge commences. The pressure in the engine cylinder now rises but at a controlled rate. Burning has been found to be complete and at low peak pressure. The maximum cylinder pressures shown by the indicator diagrams was about 620 psi.

FIG. 3 shows comparative indicator diagrams for a typical converted and unconverted engine. Curve I in dashed lines shows the curve for the original engine operating as a spark ignited gas engine. It will be seen that the peak cylinder pressure is 600 psi.

Curve II in full lines shows the indicator diagram for the same engine after conversion to operate on the cycle of the present invention. From points A and B gas is admitted into the igniter 20 and is compressed, with the air charge in the main cylinder. At point C (about 2° after top center) the injection of the oil charge begins but there is no ignition of this charge so that the pressure in the cylinder continues to fall along a normal expansion line following the compression line. At point D, 10° after top center spark ignition occurs in the igniter 20 and the pressure begins to rise as the oil charge is ignited. At point E oil injection stops and burning continues. The peak pressure reached is 620 psi.

It will be seen that the pressure diagram for the oil-fueled engine is much the same in area as the diagram for the original unconverted gas-fueled engine although events in the down stroke portion of the cycle occur later than in the original gas-fueled engine. It will be seen that the peak pressure in the oil-fueled engine occurs later in the cycle and that the rate of pressure rise at combustion is somewhat steeper, but the engine has been observed to operate with no audible knock.

What we claim is:

1. An internal combustion engine comprising, in combination, a cylinder having a cylinder head, a piston positioned within said cylinder, a first chamber defined by said head and said piston, means for filling said cylinder with a charge of air for combustion, a second chamber in communication with said first chamber, means for introducing a charge of fuel into said second chamber, means for igniting such charge in said second chamber, means for injecting a charge of oil into said first chamber and into the path of discharge from said second chamber and timing means for injecting such oil charge between top dead center and 20° after top dead center of said piston and for activating said ignition means between top dead center and 10° after top dead center of said piston.

2. An internal combustion engine comprising, in combination, a cylinder having a cylinder head, a piston positioned within said cylinder, a first combustion chamber defined by said head and said piston, means for filling said cylinder with a charge of air for combustion, a second combustion chamber in communication with said first combustion chamber, means for introducing a charge of gaseous fuel into said second combustion chamber, spark ignition means for igniting such charge in said second combustion chamber, means for injecting a charge of oil fuel into said first combustion chamber and into the path of discharge from said second combustion chamber and timing means for injecting such oil charge between top dead center and 20° after top dead center of said piston and for activating said ignition means between top dead center and 10° after top dead center of said piston.

3. A method of operating an internal combustion engine on primarily oil fuel which avoids peak combustion pressures normally attendant thereto, comprising the steps of providing a separate ignition chamber in communication with the main combustion chamber defined by a cylinder and a piston, introducing a charge of air into the main combustion chamber, introducing a charge of air and fuel gas into said ignition chamber, injecting a charge of oil fuel into said main combustion after top dead center, and igniting the charge of air and gas in said ignition chamber during such injection of such oil charge, whereby the ignition of such charge of air and gas ignites such charge of oil.

4. A method of operating an internal combustion engine on primarily oil fuel which avoids peak combustion pressures normally attendant thereto, comprising the steps of providing a separate ignition chamber in communication with the combustion chamber of an engine cylinder introducing a charge of air into the combustion chamber, introducing a charge of air and fuel gas into said ignition chamber, injecting a charge of oil fuel into said combustion chamber after top dead center, and igniting the charge of air and gas in said ignition chamber during such injection of such oil charge, whereby the residence time of such oil charge in said combustion chamber prevents preignition and the ignition of such air and gas charge ignites such charge of oil.

5. A method of combusting fuel oil in an internal combustion engine initially designed to utilize gaseous fuel, comprising the steps of providing a separate ignition chamber in communication with the combustion chamber of a cylinder introducing a charge of air into the cylinder, introducing a charge of air and fuel gas into said ignition chamber, injecting a charge of oil fuel into said combustion chamber after top dead center, and igniting the charge of air and gas in said ignition chamber during such injecting of such oil charge, whereby the ignition of such charge of air and gas ignites such charge of oil.

6. A method of combusting fuel oil in an internal combustion engine initially designed to utilize gaseous fuel, comprising the steps of providing a separate ignition chamber in communication with the combustion chamber of a cylinder, introducing a charge of air into the combustion chamber, introducing a charge of air and fuel gas into said ignition chamber, injecting a charge of oil fuel into said combustion chamber after top dead center, and igniting the charge of air and gas in said igniting chamber during such injecting of the oil charge, whereby the residence time of such oil charge in said combustion chamber precludes preignition and the ignition of the air and gas charge ignites the charge of oil.

* * * * *